(12) United States Patent
Setton et al.

(10) Patent No.: US 8,560,633 B2
(45) Date of Patent: Oct. 15, 2013

(54) COMMUNICATING IN A PEER-TO-PEER COMPUTER ENVIRONMENT

(75) Inventors: Eric E. Setton, Palo Alto, CA (US); Gregory Dorso, San Jose, CA (US); Barry Andrews, Los Altos, CA (US)

(73) Assignee: TangoMe, Inc., Mountain View, CA (US)

( * ) Notice: Subject to any disclaimer, the term of this patent is extended or adjusted under 35 U.S.C. 154(b) by 674 days.

(21) Appl. No.: 12/685,553

(22) Filed: Jan. 11, 2010

(65) Prior Publication Data

US 2011/0173259 A1   Jul. 14, 2011

(51) Int. Cl.
G06F 15/16 (2006.01)

(52) U.S. Cl.
USPC .......................................................... 709/217

(58) Field of Classification Search
USPC .......................................................... 709/217
See application file for complete search history.

(56) References Cited

U.S. PATENT DOCUMENTS

| | | | |
|---|---|---|---|
| 6,314,108 B1 | 11/2001 | Ramasubramani et al. | |
| 6,614,774 B1 | 9/2003 | Wang | |
| 6,651,250 B1 | 11/2003 | Takai | |
| 7,213,047 B2 * | 5/2007 | Yeager et al. | 709/202 |
| 7,254,608 B2 * | 8/2007 | Yeager et al. | 709/203 |
| 7,386,878 B2 * | 6/2008 | Fernando et al. | 726/3 |
| 7,596,618 B2 * | 9/2009 | Basu et al. | 709/226 |
| 7,689,220 B2 | 3/2010 | Fukushima et al. | |
| 7,707,034 B2 * | 4/2010 | Sun et al. | 704/262 |
| 7,788,378 B2 * | 8/2010 | Rao et al. | 709/226 |
| 7,809,943 B2 * | 10/2010 | Seidel | 713/164 |
| 7,882,248 B2 * | 2/2011 | Sano et al. | 709/228 |
| 8,037,202 B2 * | 10/2011 | Yeager et al. | 709/238 |
| 8,108,455 B2 * | 1/2012 | Yeager et al. | 709/202 |
| 2002/0062375 A1 * | 5/2002 | Teodosiu et al. | 709/226 |
| 2004/0030749 A1 | 2/2004 | Bowman-Amuah | |
| 2004/0039810 A1 | 2/2004 | Donescu et al. | |
| 2004/0088347 A1 | 5/2004 | Yeager et al. | |
| 2004/0088348 A1 | 5/2004 | Yeager et al. | |
| 2004/0088369 A1 | 5/2004 | Yeager et al. | |
| 2004/0133640 A1 | 7/2004 | Yeager et al. | |
| 2004/0181689 A1 | 9/2004 | Kiyoto et al. | |
| 2005/0238047 A1 | 10/2005 | Holland et al. | |
| 2006/0111112 A1 | 5/2006 | Maveddat | |
| 2006/0256751 A1 | 11/2006 | Jagadeesan et al. | |

(Continued)

FOREIGN PATENT DOCUMENTS

| | | |
|---|---|---|
| EP | 1229443 | 8/2002 |
| WO | WO-02/42900 | 5/2002 |
| WO | WO 2010/002302 A1 * | 7/2008 |

OTHER PUBLICATIONS

Eronen, Pasi "Security in the Jini Networking Technology: A Decentralized Trust Management Approach", *Master's Thesis, Helsinki University of Technology, Department of Computer Science and Engineering*, (Mar. 2001),31-33.

(Continued)

*Primary Examiner* — Alicia Baturay (57) ABSTRACT

Communicating in a peer-to-peer computer environment. A request is received from a user at a peer provider node computer system, wherein the request is signed by a private key. Provided a public key verifies the private key, providing potential peers to the user from the peer provider node computer system such that the user is enabled to utilize the peer-to-peer computer environment for a communication according to user requirements.

31 Claims, 3 Drawing Sheets

(56) References Cited

U.S. PATENT DOCUMENTS

| | | | |
|---|---|---|---|
| 2007/0028133 A1 | 2/2007 | Izutsu et al. | |
| 2007/0047516 A1 | 3/2007 | Kottilingal | |
| 2007/0074019 A1 | 3/2007 | Seidel | |
| 2007/0162605 A1 | 7/2007 | Chalasani et al. | |
| 2007/0274210 A1 | 11/2007 | Jang | |
| 2008/0126549 A1 | 5/2008 | Khanchandani et al. | |
| 2008/0201484 A1 | 8/2008 | Sano et al. | |
| 2009/0125637 A1 | 5/2009 | Matuszewski | |
| 2009/0172180 A1* | 7/2009 | Chiu et al. | 709/231 |
| 2009/0177792 A1* | 7/2009 | Guo et al. | 709/231 |
| 2009/0313353 A1 | 12/2009 | Lou | |
| 2010/0031335 A1* | 2/2010 | Handler | 726/8 |
| 2010/0146092 A1 | 6/2010 | Hu et al. | |
| 2010/0146126 A1 | 6/2010 | Lin et al. | |
| 2010/0150252 A1* | 6/2010 | Camp et al. | 375/240.27 |
| 2010/0177699 A1 | 7/2010 | Klefter et al. | |
| 2010/0246788 A1 | 9/2010 | Menard et al. | |
| 2010/0299687 A1 | 11/2010 | Bertino-Clarke | |
| 2011/0087783 A1 | 4/2011 | Annapureddy et al. | |
| 2011/0087915 A1 | 4/2011 | Zhang et al. | |
| 2011/0137991 A1 | 6/2011 | Russell | |
| 2011/0282945 A1* | 11/2011 | Thyni et al. | 709/204 |

OTHER PUBLICATIONS

"Jini Architecture Specification", *Sun Microsystems, Inc. Version 1.2*, (Dec. 2001),12-22.

* cited by examiner

FIG. 1

Process
200

A request is received from a user at a peer provider node computer system, wherein the request is signed by a private key.
202

Provided a public key verifies the private key, providing potential peers to the user from the peer provider node computer system such that the user is enabled to utilize the peer-to-peer computer environment for a communication according to user requirements.
204

A request is received from the user at a storage peer, wherein the storage peer is one of the potential peers and wherein the request is signed by a private key.
206

Provided a public key verifies the private key, providing encrypted profile information to the user.
208

A portion of the communication is received from the user at a relay peer, wherein the relay peer is one of the potential peers.
210

The portion of the communication is sent to at least one other user from the relay peer.
212

Connection maintenance step.
214

FIG. 2

FIG. 3

COMMUNICATING IN A PEER-TO-PEER COMPUTER ENVIRONMENT

BACKGROUND

Modern technology provides for a variety of communication means and methods. For example, there are many types of communications including voice calls, video calls, text messages, photo messages, etc. Additionally, communication may be one-to-one or multi-party communications. Typically multi-party communications are accomplished by a plurality of devices communicating with a central infrastructure. For example, a central infrastructure may be a central computer server or a group of computer servers maintained in a server farm. A central infrastructure may be expensive to establish, maintain and operate.

BRIEF DESCRIPTION OF THE DRAWINGS

The drawings referred to in this description of embodiments should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "receiving," "providing," "sending," "terminating," "authenticating," "transmitting," "communicating," or the like, refer to the actions and processes of a computer system, or similar electronic computing device. The computer system or similar electronic computing device, such as a telephone or handheld mobile device, manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Overview of Discussion

Embodiments of the present technology are for communicating in a peer-to-peer computer environment. A single user may be capable of communicating one-to-one with another user via user devices using no relays. However, such a connection without a relay may not be possible or may be poor quality, unreliable and lack effective scalability to extend a call to a multiparty call.

Embodiments of the present technology allow a user to communicate to at least one other user via user devices associated with a peer-to-peer computer environment. In one embodiment, a user employing a user device is verified by a peer provider node associated with the peer-to-peer computer environment using a public and private encryption key. The peer provider node then provides the user device with a list of potential peers associated with the peer-to-peer computer environment. The user device then contacts the potential peers to determine their availability and capabilities. Potential peers may then be selected and used as relays peers for a communication with a second user device. A user device may be employed by a plurality of users. In such a case, a different encryption key is associated with each user.

In one embodiment, pluralities of relay peers are employed to transmit the communication to a second user device. The user device may divide the communication into portions and each portion is sent via a different relay peer. For example, the audio portion of a communication is divided from the video portion of the communication and sent over different relay peers.

In one embodiment, the relay peers each receive a portion of the communication and replicate the portion. The replicated portions may be sent to a plurality of user devices each being employed by a user. Thus, scalability is achieved and a multi-party communication may be achieved without loss of quality or reliability.

Once a connection is established to the peer-to-peer computer environment, more potential peers may be identified. This may take place during idle time when the user device is not communicating with another user device or during a communication. For example, a relay peer may transmit a list of known peers to the user device. The user device may then contact the peers known to the relay peer and identify additional peers that may be used as relay peers. This process may be repeated with the newly identified peers to generate more potential peers for use as relays. Processes and steps taken by a user device may controlled by the user, the user device and its programming or a combination of the two.

A communication as used in the present disclosure may refer to several types of communications, including but not limited to, real-time audio and/or video communication, text messages, photo messages, video messages, etc. wherein the communication and messages are sent and received via electronic communication devices. User devices may be, but are not limited to, telephones, computer systems, netbooks, notebooks, televisions, hand held devices, mobile devices, smart phones, cellular phones, personal digital assistants, connected televisions, etc. In the present disclosure the terms relay peer(s) or storage peer(s) refer to electronic devices that are nodes or peers in a peer-to-peer computer environment. The term peer provider node may refer to either a peer in a peer-to-peer computer environment or a server computer system.

It should be appreciated that a peer-to-peer computer environment is well known in the art and is also known as a peer-to-peer network and is often abbreviated as P2P. It should be understood that a peer-to-peer computer environment may comprise multiple computer systems, and may include routers and switches, of varying types that communicate with each other using designated protocols. In one embodiment, a peer-to-peer computer environment is a distributed network architecture that is composed of participants that make a portion of their resources (such as processing power, disk storage, and network bandwidth) available directly to their peers without intermediary network hosts or servers. Participants may be known as nodes or peers. In one embodiment, peer-to-peer technology is used to manage a cluster of nodes.

The following discussion will demonstrate various hardware, software, and firmware components that are used with and in computer systems for communicating in a peer-to-peer computer environment using various embodiments of the present technology. Furthermore, the systems and methods may include some, all, or none of the hardware, software, and firmware components discussed below.

Embodiments of Communicating in a Peer-to-Peer Computer Environment

Figure 1:
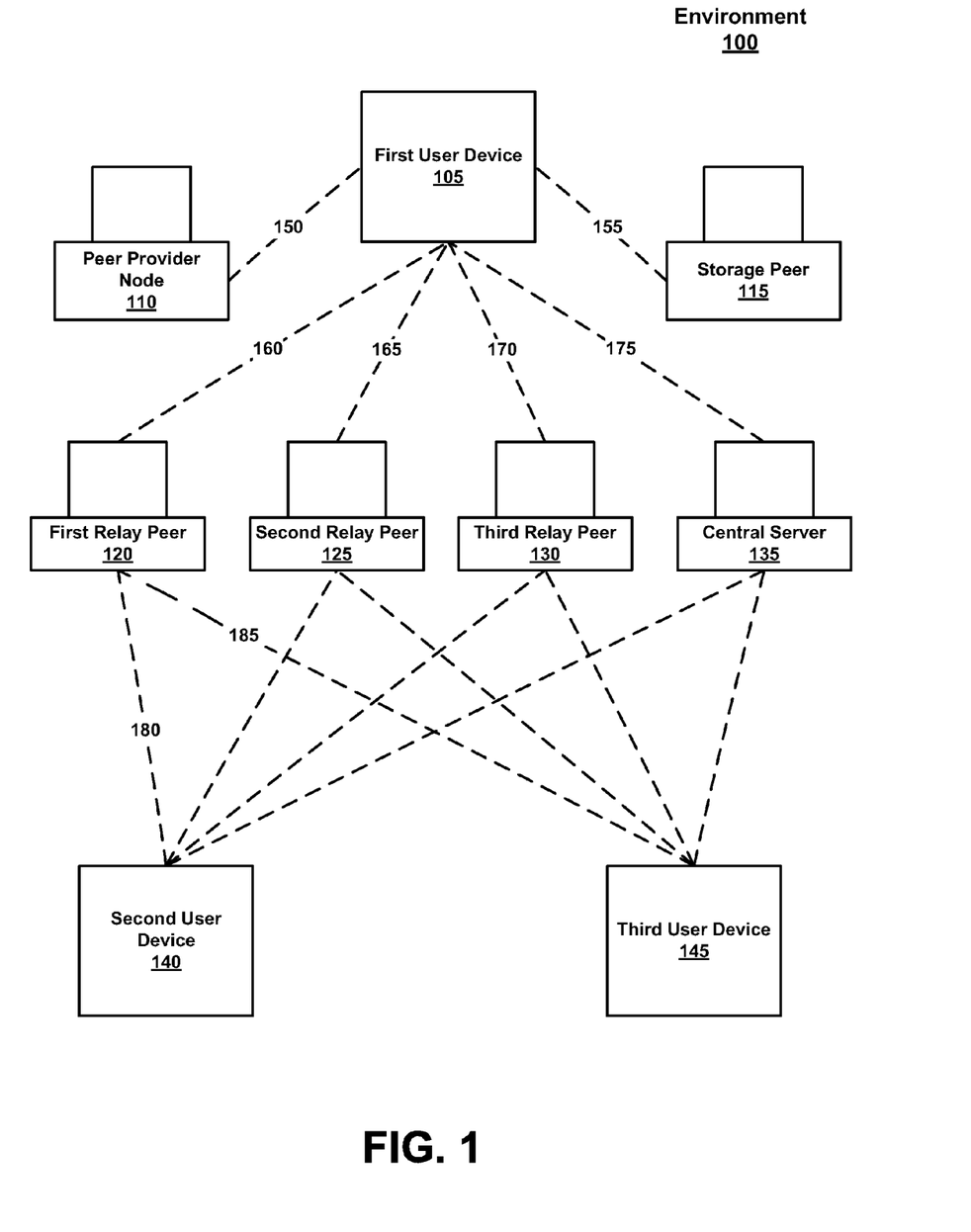
FIG. 1 illustrates a block diagram of an example environment for communicating in a peer-to-peer computer environment in accordance with embodiments of the present technology.

With reference now to FIG. 1, a block diagram of an environment 100 for communicating in a peer-to-peer computer environment. Environment 100 includes first user device 105, peer provider node 110, storage peer 115, first relay peer 120, second relay peer 125, third relay peer 130, central server 135, second user device 140, third user device 145, connection lines 150 and 155, and communication lines 160, 165, 170, 175, 180, and 185. Environment 100 comprises components that may or may not be used with different embodiments of the present technology and should not be construed to limit the present technology.

In one embodiment, environment 100 comprises a peer-to-peer computer environment that includes, but is not limited to, first user device 105, peer provider node 110, storage peer 115, first relay peer 120, second relay peer 125, third relay peer 130, central server 135, second user device 140, and third user device 145. In one embodiment, each of the components is able to connect with and communicate with any other device or peer in the peer-to-peer computer environment. In one embodiment, every device or peer is not able to connect with or communicate with every other device or peer, but is at least able to connect with and communicate with one other device or peer.

In one embodiment, first user device 105 is an electronic device used for communicating in a peer-to-peer computer environment. First user device 105 may be a computer system, a netbook, a notebook, a hand held device, a mobile device, a smart phone, a cellular phone, a personal digital assistant, etc. First user device 105 must have some type of connectivity to a network such as Ethernet, WiFi, WiMax, a cellular network, etc. In one embodiment, first user device 105 is required to install an application for purposes of the present technology. In one embodiment, first user device 105 is not required to install any additional application and instead may practice the present technology using technology already installed on first user device 105. For example, first user device 105 may use a web browser application to practice the present technology. In one embodiment, second user device 140 and third user device 145 comprise the same features as first user device 105.

In one embodiment, the peer-to-peer computer environment comprises a peer provider node computer system such as peer provider node 110. The purpose of peer provider node 110 is to receive a request from a user such as first user device 105, wherein the request is signed by a private key. The private key is verified using a public key. The request may also be comprise additional authorization information such as user credentials or a username and password or a cryptographic certificate. The public and private keys and the authorization information is used by peer provider node 110 as a security measure to verify the identity of the user. In one embodiment, upon verification of first user device 105, peer provider node 110 provides potential peers to first user device 105. For example, peer provider node 110 may provide data identifying first relay peer 120, second relay peer 125, and third relay peer 130 as peers or nodes associated with the peer-to-peer computer environment. Additionally, peer provider node 110 may provide data identifying storage peers such as storage peer 115. Peer provider node 110 may be combined with other components of environment 100 to provide data to users. Peer provider node 110 also has the ability to be updated by the peer-to-peer computer environment with data regarding potential peers and storage peers. In one embodiment, the peer-to-peer computer environment comprises more than one peer provider node.

A user may present her credentials (i.e. login/password, certificate) to peer provider node 110 via first user device 105 using a web-based client interface or standalone client installed on first user device 105.

In one embodiment, first user device 105 receives data from peer provider node 110 identifying storage peer 115 as a storage peer computer system associated with the peer-to-peer computer environment. In one embodiment, storage peer 115 is capable of verifying the identity of first user device 105 and providing first user device 105 with contact information such as an address book and other profile information. In one embodiment, the profile information stored on storage peer 115 is encrypted and storage peer 115 does not possess an encryption key to decrypt the profile information, while first user device 105 does possess such an encryption key which corresponds to a user of first user device 105. It should be appreciated that first user device 105 may possess more than one encryption key wherein each encryption key corresponds to a unique user or user account. A peer-to-peer computer environment may comprise several storage peers and a user's profile information may be stored on more than one storage peer or may be replicated to more than one storage peer. It should be appreciated that storage peer 115 may be a peer on the peer-to-peer computer environment that is capable of performing other services such as the services required by peer provider node 110 or a relay peer. Thus a peer or node associated with the peer-to-peer computer environment may function as a relay peer, a peer provider node, a storage peer, or any combination thereof.

In one embodiment, first user device 105 identifies potential peers associated with the peer-to-peer computer environment using the data obtained from peer provider node 110. First user device 105 then contacts each of the potential peers and to assess the potential peers' availability and capabilities. First user device 105 may make a determination, based on user requirements, as to which potential peers may be utilized as relays peers. Such a determination may be made based on the capabilities and availability of the potential peers. The capabilities of the potential peer may include the potential peer's available downlink throughput and uplink throughput as well as processing power and speed. In one embodiment, the user requirements for a potential peer comprise an estimated geographical length of a path taken by a communication through the peer-to-peer computer environment. In one embodiment, the user requirement is to reduce a number of hops taken by a communication through the peer-to-peer computer environment. In one embodiment, the user requirement is to reduce a round trip time of a communication through the peer-to-peer computer environment. In one embodiment, the user requirement is a compatibility of a network address translator (NAT) or firewall between a relay peer and the user devices. An algorithm may be used to determine compliance with the user requirements.

In one embodiment, a peer may provide first user device with data identifying potential relays. First user device 105 may then contact the potential relay peers identified by the peer that were not identified by peer provider node 110 to determine if such potential relay peers may be utilized by first user device 105 as a relay peer for communications. This process may be repeated with a subset or with all of the potential relay peers identified by the peers that were not identified by peer provider node 110. In this manner first user device 105 may increase the number of potential peers that may be utilized as relay peers. In one embodiment, a list of potential relay peers is stored on user device 105 between sessions and is used to avoid having to contact peer provider node 110 for a new list every session. In one embodiment, the process of identifying additional potential relay peers is performed during idle times when first user device 105 is not performing a communication.

In one embodiment, first user device 105 may determine that first relay peer 120 may be utilized as a relay peer for communication. First relay peer 120 may be a computer system or other device associated with the peer-to-peer computer environment. In one embodiment, first relay peer 120 receives a communication from first user device 105 over communication line 160 and relays the communication to second user device 140 over communication line 180 in a one-to-one communication. In one embodiment, first relay peer 120 may receive a communication from first user device 105 and replicate the communication. The replicated communication may also be used to send the communication to both second user device 140 and third user device 145 in a multi-party communication. Thus replicating and relaying a communication to both second user device 140 and third user device 145 comprise relaying or sending a communication to a plurality of devices. It should be appreciated that a relay may require verification from a user device for each action it takes. In other words, a relay peer may require a communication sent to a relay peer from a user device to be signed by an encryption key. The encryption key is then verified using a second key. Such a step may take place each time data is received at a relay peer.

First user device 105 may send information regarding the presence status of a user to a relay peer. This information may in turn be relayed to the contacts of a user. The information may also be updated each time a user changes status.

In one embodiment, first relay peer 120 receives only a portion of a communication, second relay peer 125 receives a different portion of the communication, and third relay peer 130 receives yet a different portion of the communication from first user device 105. First relay peer 120, second relay peer 125, and third relay peer 130 then send or relay their respective portions of the communication to second user device 140. Thus a communication is relayed using a plurality of relay peers. It should be appreciated that a communication may be relayed using any number of peers and is not limited to first relay peer 120, second relay peer 125, and third relay peer 130 of FIG. 1. Additionally, first relay peer 120, second relay peer 125, and third relay peer 130 may each replicate their respective portions of the communication. In one embodiment, the replicated portions are sent to third user device 145 and the original portions are sent to second user device 140 for a multi-party communication.

In one embodiment, a communication may be divided such that one portion is audio and one portion is video. An audio or video portion may also be divided into multiple portions to be sent over multiple relay peers. For example, a communication may be divided such that the audio is divided into three portions where one portion is considered the base portion and is given priority or protection over the other portions. The two other audio portions provide additional details to the base portion such that if only the base portion is relayed to second user device 140, the audio communication will be accomplished, but each additional portion that is relayed to second user device 140 will increase the quality of the audio communication. Additionally, an audio portion may be given priority or protection over a video portion. A video portion divided into to sub-portions may similarly provide a low-resolution portion and a hi-resolution portion.

It should be appreciated that the described relay processes performed by first relay peer 120, second relay peer 125, and third relay peer 130 may be reversed where the relay peers are receiving communications or portions of communications from second user device 140 or third user device 145 and then relayed to other user devices such as first user device 105. Therefore a given relay peer in the peer-to-peer computer environment may receive a communication from a first user device then relay the communication to a second user device and also receive a communication from the second user device and relay it to the first user device. Thus a multi-party communication may include two-way communications for each user device involved. Additionally, the number of user devices in a multi-party call is not limited to first user device 105, second user device 140 and third user device 145, but may be performed using any number of user devices.

In one embodiment, relay peers may be added or removed during the communication. For example, a communication may begin utilizing two relay peers and subsequently removes a relay peer. This may be useful if second user device 140 is receiving an audio portion over first relay peer 120 and a video portion over second relay peer 120 and the video portion is terminated during the communication. Then second relay peer 125 may be removed from relaying or sending the communication. Another example may be a communication using both first relay peer 120 and second relay peer 125 to communicate to both second user device 140 and third user device 145 in a multi-party communication. In this example, if either second user device 140 or third user device 145 terminates the communication, the other user devices may continue the communication using only first relay peer 120. Conversely, more relay peers may be added to a communication as additional portions of communication are added or additional user devices are added to a multi-party communication during a communication. Thus the ability to add relay peers to a communication in progress provides scalability and reliability to a communication sent over a peer-to-peer computer environment.

In one embodiment, a relay peer sending or relaying a given portion of a communication may terminate the relaying during a communication and a second relay peer may be selected to continue relaying the remaining portion of the communication. Thus reliability for the communication is maintained during the regular churn of a peer-to-peer computer environment as peers join and leave the peer-to-peer computer environment.

In one embodiment, a relay peer may receive feedback from a user device that is receiving a communication from the relay peer. The feedback may comprise information such as the quality of the call or an amount of the communication not being received at the receiving user device. This feedback may be relayed to the sending user device. First user device 105 may decide to change relays or the number of relay peers may be adjusted based on the feedback. For example, first user device 105 may utilize first relay peer 120 and second relay peer 125 to relay a communication divided into two portions to second user device 140. In this example first relay peer 120 may receive feedback from second user device 140 that the communication quality is below a threshold. At this point in the communication, first user device 105 divides the remainder of the communication into three portions and send the three portions over first relay peer 120, second relay peer 125, and third relay peer 130 respectively. Thus third relay peer 130 was added to increase the diversity of paths used for communicating or the redundancy in the data relayed across the peer-to-peer computer environment in an attempt to increase the quality of the communication. Any number of relay peers may be added or removed in this manner during a communication.

Additionally, user device may adjust a parameter of the communication based on a feedback received from another user device via a relay peer. In one embodiment, adjusting a parameter may be adjusting an encoding rate of the communication. In one embodiment, adjusting a parameter may be adjusting a resolution communication In one embodiment, adjusting a parameter may be changing a codec used for the communication. In one embodiment, adjusting a parameter may be changing the error protection scheme of the communication.

In one embodiment, first user device 105 may communicate with second user device 140 in a one-to-one communication. For such a one-to-one communication, the present technology may be employed with or without relay peers. If a relay peer is not used, there must be compatibility of NATs and firewalls between the user devices. A protocol such as Interactive Connectivity Establishment (ICE), Traversal Using Relay NAT (TURN) or Session Traversal Utilities for NAT (STUN) may be used to accomplish a one-to-one communication without a relay peer. Layered coding and unequal error protection for the different layers is used to ensure sufficient protection for the lower layers in case of data loss. Encoding rates may also be increased or reduced during a communication.

In one embodiment, environment 100 includes central server 135. Central server 135 represents a server computer system or a group of server computer systems such as a server farm. In one embodiment, central server 135 is not employed. In one embodiment, central server 135 is utilized as a back-up system for peer provider node 110, storage peer 115, first relay peer 120, second relay peer 125, and/or third relay peer 130. Thus central server 135 may perform any of the tasks functions or services of peer provider node 110, storage peer 115, first relay peer 120, second relay peer 125, and/or third relay peer 130. Therefore if one of the components of the peer-to-peer computer environment fails to perform its task, service or operation, central server 135 may be utilized to perform the task, service or operation. Central server 135 provides an additional layer of reliability in a peer-to-peer computer environment where peers and nodes join and leave the environment due to regular churn.

Operation

Figure 2:
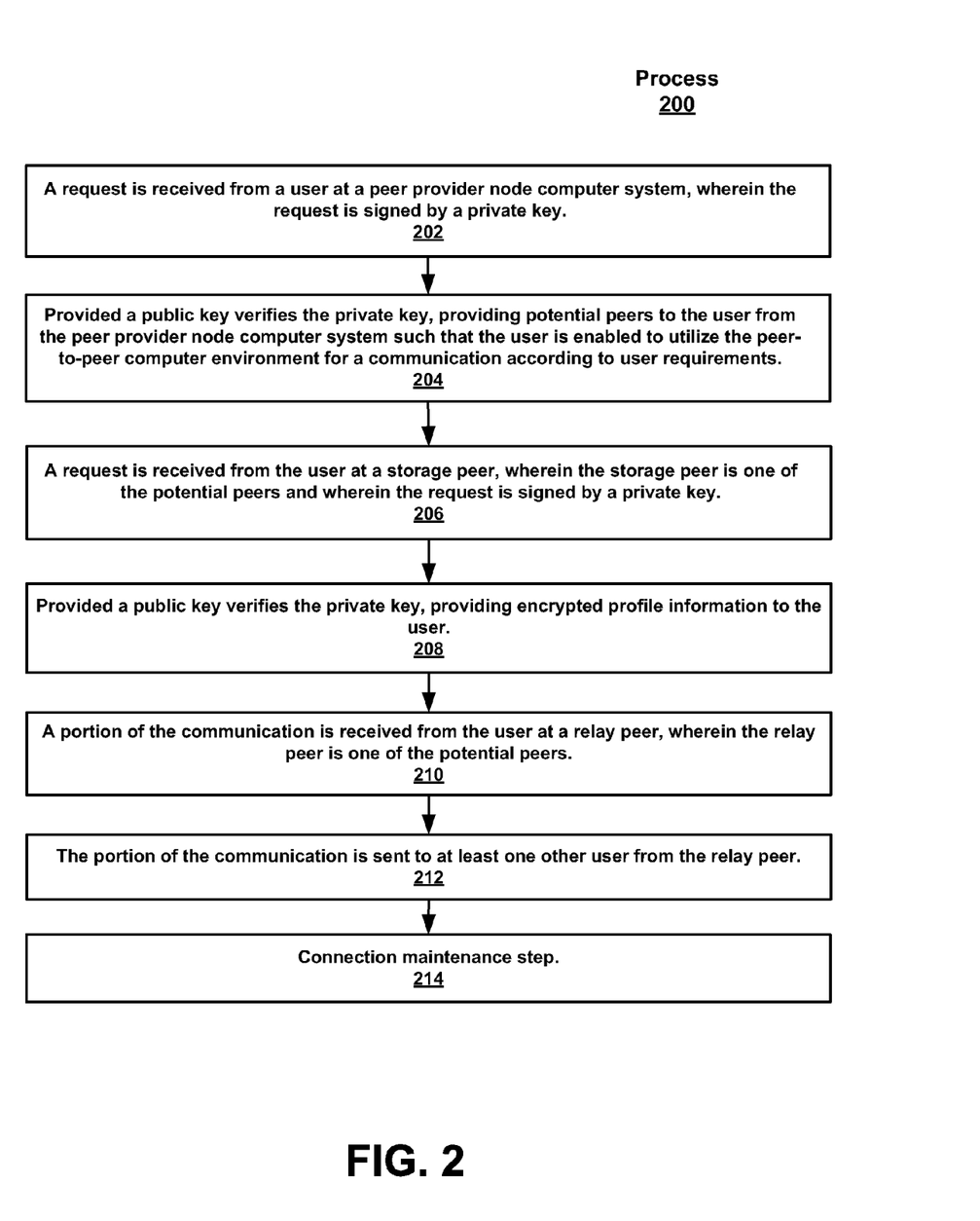
FIG. 2 illustrates a flowchart of an example method for communicating in a peer-to-peer computer environment in accordance with embodiments of the present technology.

FIG. 2 is a flowchart illustrating process 200 for communicating in a peer-to-peer computer environment, in accordance with one embodiment of the present invention. In one embodiment, process 200 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 200 is performed by peer provider node 110, storage peer 115, and first relay 120 of FIG. 1. In one embodiment, the methods may reside in a computer usable storage medium having instructions embodied therein that when executed cause a computer system to perform the method.

At step 202, a request is received from a user at a peer provider node computer system, wherein the request is signed by a private key. In one embodiment, peer provider node 110 of FIG. 1 is utilized for step 202. The request may also be verified using authentication information such as a username and password, another is a cryptographic certificate.

At step 204, provided a public key verifies the private key, providing potential peers to the user from the peer provider node computer system such that the user is enabled to utilize the peer-to-peer computer environment for a communication according to user requirements. In one embodiment, the list of potential peers is updated periodically to the peer provider node computer system.

At step 206, a request is received from the user at a storage peer, wherein the storage peer is one of the potential peers and wherein the request is signed by a private key. In one embodiment, more than one storage peers are utilized for redundancy and to split data to be stored in more than one peer so that one storage peer is not required to provide all data at one time.

At step 208, provided a public key verifies the private key, providing encrypted profile information to the user. In one embodiment, the storage peer does not have a key to the encrypted data; therefore the storage peer is unable to access the data but is only able to provide the data to an authorized user.

At step 210, a portion of the communication is received from the user at a relay peer, wherein the relay peer is one of the potential peers. In one embodiment, a potential peer is obtained by contacting a potential peer received from the peer provider node and then receiving a list of additional potential peers that were not received from the peer provider node. In one embodiment, a list of potential relay peers is stored on user device 105 between sessions and is used to avoid having to contact peer provider node 110 for a new list every session. In one embodiment, a plurality of relay peers are utilized to relay a communication or a portion of a communication.

At step 212, the portion of the communication is sent to at least one other user from the relay peer. In this manner a one-to-one communication is practiced. In one embodiment, plurality of user devices receive the communication from the relay peer or from a plurality of relay peers.

In one embodiment, connection maintenance step 214 comprises sending the portion of the communication to another relay peer when the user detects the first relay peer is no longer available during the communication. For example, a peer being used as a relay peer may leave the peer-to-peer computer environment and may no longer be available as a relay peer. Also, a relay peer may have other tasks in the peer-to-peer computer environment that have a higher priority than relaying the communication.

In one embodiment, connection maintenance step 214 comprises receiving the portion of the communication from the user at a second relay peer. The second relay peer essentially picks up where the first relay peer left off. The second relay peer is identified as a potential relay peer either before or during the communication.

In one embodiment, connection maintenance step 214 comprises the portion of the communication is sent to at least one other user from the second relay peer. Thus a multi-party communication may be practiced.

In one embodiment, connection maintenance step 214 comprises feedback is sent to the user from the relay peer regarding the communication during the communication. Such feedback may be employed to adjust the number of relay peers utilized for a communication or may be used to adjust a parameter of the communication while the communication is in progress.

Example Computer System Environment

Figure 3:
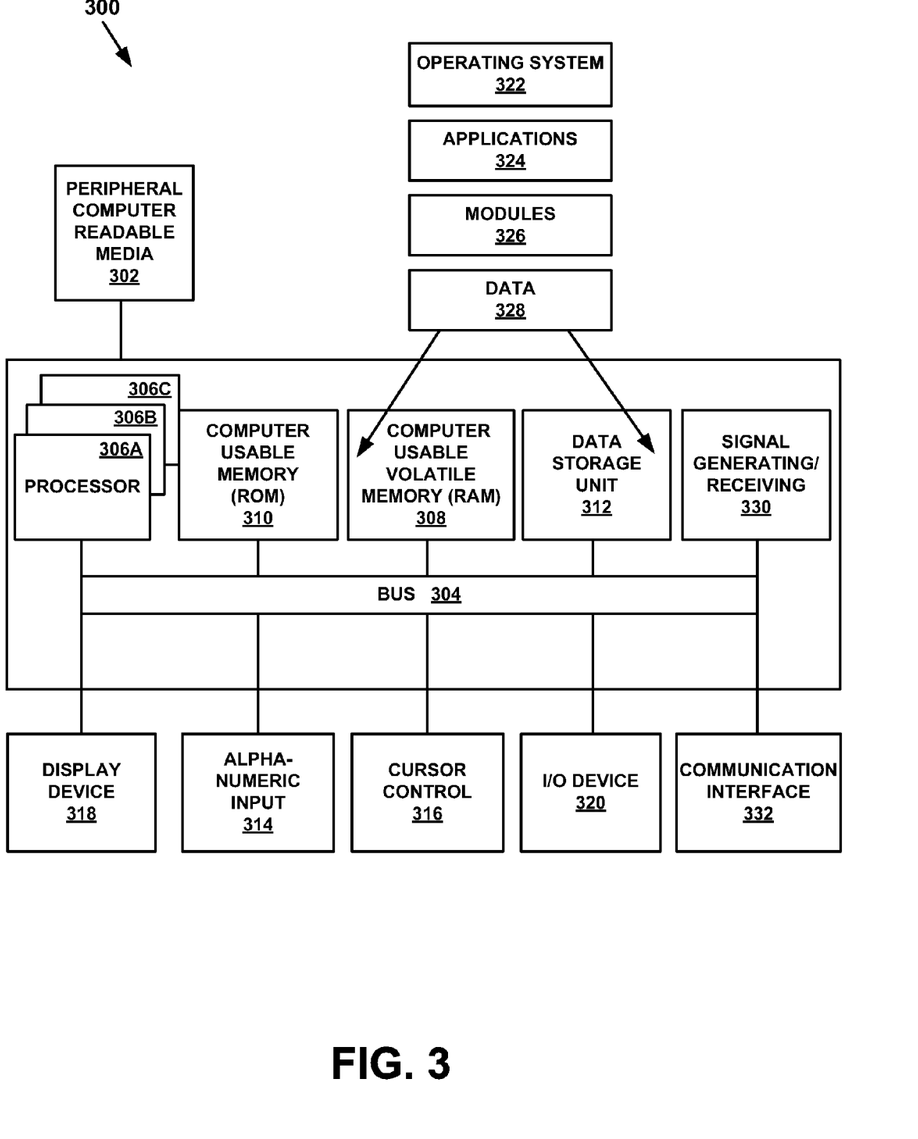
FIG. 3 illustrates a diagram of an example computer system upon which embodiments of the present technology may be implemented.

With reference now to FIG. 3, portions of the technology for providing a communication composed of computer-readable and computer-executable instructions that reside, for example, in computer-usable media of a computer system. That is, FIG. 3 illustrates one example of a type of computer that can be used to implement embodiments of the present technology.

FIG. 3 illustrates an example computer system 300 used in accordance with embodiments of the present technology. It is appreciated that system 300 of FIG. 3 is an example only and that the present technology can operate on or within a number of different computer systems including general purpose networked computer systems, embedded computer systems, routers, switches, server devices, user devices, various intermediate devices/artifacts, stand alone computer systems, mobile phones, personal data assistants, televisions and the like. As shown in FIG. 3, computer system 300 of FIG. 3 is well adapted to having peripheral computer readable media 302 such as, for example, a floppy disk, a compact disc, and the like coupled thereto.

System 300 of FIG. 3 includes an address/data bus 304 for communicating information, and a processor 306A coupled to bus 304 for processing information and instructions. As depicted in FIG. 3, system 300 is also well suited to a multi-processor environment in which a plurality of processors 306A, 306B, and 306C are present. Conversely, system 300 is also well suited to having a single processor such as, for example, processor 306A. Processors 306A, 306B, and 306C may be any of various types of microprocessors. System 300 also includes data storage features such as a computer usable volatile memory 308, e.g. random access memory (RAM), coupled to bus 304 for storing information and instructions for processors 306A, 306B, and 306C.

System 300 also includes computer usable non-volatile memory 310, e.g. read only memory (ROM), coupled to bus 304 for storing static information and instructions for processors 306A, 306B, and 306C. Also present in system 300 is a data storage unit 312 (e.g., a magnetic or optical disk and disk drive) coupled to bus 304 for storing information and instructions. System 300 also includes an optional alpha-numeric input device 314 including alphanumeric and function keys coupled to bus 304 for communicating information and command selections to processor 306A or processors 306A, 306B, and 306C. System 300 also includes an optional cursor control device 316 coupled to bus 304 for communicating user input information and command selections to processor 306A or processors 306A, 306B, and 306C. System 300 of the present embodiment also includes an optional display device 318 coupled to bus 304 for displaying information.

Referring still to FIG. 3, optional display device 318 of FIG. 3 may be a liquid crystal device, cathode ray tube, plasma display device or other display device suitable for creating graphic images and alpha-numeric characters recognizable to a user. Optional cursor control device 316 allows the computer user to dynamically signal the movement of a visible symbol (cursor) on a display screen of display device 318. Many implementations of cursor control device 316 are known in the art including a trackball, mouse, touch pad, joystick or special keys on alpha-numeric input device 314 capable of signaling movement of a given direction or manner of displacement. Alternatively, it will be appreciated that a cursor can be directed and/or activated via input from alpha-numeric input device 314 using special keys and key sequence commands.

System 300 is also well suited to having a cursor directed by other means such as, for example, voice commands. System 300 also includes an I/O device 320 for coupling system 300 with external entities. For example, in one embodiment, I/O device 320 is a modem for enabling wired or wireless communications between system 300 and an external network such as, but not limited to, the Internet. A more detailed discussion of the present technology is found below.

Referring still to FIG. 3, various other components are depicted for system 300. Specifically, when present, an operating system 322, applications 324, modules 326, and data 328 are shown as typically residing in one or some combination of computer usable volatile memory 308, e.g. random access memory (RAM), and data storage unit 312. However, it is appreciated that in some embodiments, operating system 322 may be stored in other locations such as on a network or on a flash drive; and that further, operating system 322 may be accessed from a remote location via, for example, a coupling to the internet. In one embodiment, the present technology, for example, is stored as an application 324 or module 326 in memory locations within RAM 308 and memory areas within data storage unit 312. The present technology may be applied to one or more elements of described system 300. For example, a method of modifying user interface 225A of device 115A may be applied to operating system 322, applications 324, modules 326, and/or data 328.

System 300 also includes one or more signal generating and receiving device(s) 330 coupled with bus 304 for enabling system 300 to interface with other electronic devices and computer systems. Signal generating and receiving device(s) 330 of the present embodiment may include wired serial adaptors, modems, and network adaptors, wireless modems, and wireless network adaptors, and other such communication technology. The signal generating and receiving device(s) 330 may work in conjunction with one or more communication interface(s) 332 for coupling information to and/or from system 300. Communication interface 332 may include a serial port, parallel port, Universal Serial Bus (USB), Ethernet port, antenna, or other input/output interface. Communication interface 332 may physically, electrically, optically, or wirelessly (e.g. via radio frequency) couple system 300 with another device, such as a cellular telephone, radio, or computer system.

The computing system 300 is only one example of a suitable computing environment and is not intended to suggest any limitation as to the scope of use or functionality of the present technology. Neither should the computing environment 300 be interpreted as having any dependency or requirement relating to any one or combination of components illustrated in the example computing system 300.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Embodiments of the present technology may be described in the general context of computer-executable instructions, such as program modules, being executed by a computer. Generally, program modules include routines, programs, objects, components, data structures, etc., that perform particular tasks or implement particular abstract data types. Embodiments of the present technology may also be practiced in distributed computing environments where tasks are performed by remote processing devices that are linked through a communications network. In a distributed computing environment, program modules may be located in both local and remote computer-storage media including memory-storage devices.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer implemented method for communicating in a peer-to-peer computer environment, said method comprising:
   receiving a request from a user at a peer provider node computer system, wherein said request is signed by a private key, wherein said peer provider node computer system is a peer node;
   provided a public key verifies said private key, providing potential peers to said user from said peer provider node computer system such that said user is enabled to utilize said peer-to-peer computer environment for a communication according to user requirements;
   selecting a relay peer from said potential peers at said user wherein said user contacts each of said potential peers and said relay peer is selected via said user based on communication and hardware capabilities of said potential peers and wherein said relay peer is for said communication;
   receiving a portion of said communication from said user at a relay peer, wherein said relay peer is one of said potential peers;
   sending said portion of said communication to at least one other user from said relay peer;
   sending feedback to said user from said relay peer regarding said communication during said communication;
   wherein said receiving said portion of said communication is received with an adjusted parameter of said communication; and
   wherein said portion of said communication is received with a different error protection scheme for said portion.

2. The computer implemented method as recited in claim 1, further comprising:
   receiving a request from said user at a storage peer, wherein said storage peer is one of said potential peers and wherein said request is signed by a private key; and
   provided a public key verifies said private key, providing encrypted profile information to said user.

3. The computer implemented method as recited in claim 1, further comprising:
   terminating said receiving said portion of said communication from said user at said relay peer during said communication;
   receiving said portion of said communication from said user at a second relay peer; and
   sending said portion of said communication to at least one other user from said second relay peer.

4. The computer implemented method as recited in claim 1 wherein said relay peer replicates said portion of said communication and sends said replicated said portion to a plurality of other users.

5. The computer implemented method as recited in claim 1 wherein said portion of said communication is received with an adjusted encoding rate of said portion.

6. The computer implemented method as recited in claim 1 wherein said portion of said communication is received with an adjusted resolution of said portion.

7. The computer implemented method as recited in claim 1 wherein said portion of said communication is received with a different codec for said portion.

8. The computer implemented method as recited in claim 1, further comprising:
   receiving a plurality of portions of said communication from said user at a plurality of relay peers, wherein said plurality of relay peers are said potential peers and wherein each of said plurality of relay peers each receives a different portion of said plurality of portions of said communication; and
   sending said plurality of portions of said communication to at least one other user from said plurality of relay peers.

9. The computer implemented method as recited in claim 1 wherein said communication is an audio communication.

10. The computer implemented method as recited in claim 1 wherein said communication is a video communication.

11. The computer implemented method as recited in claim 1 wherein said communication is a multi-party communication.

12. The computer implemented method as recited in claim 1 wherein said user requirement is to reduce an estimated geographical length of a path taken by said communication through said peer-to-peer computer environment.

13. The computer implemented method as recited in claim 1 wherein said user requirements is to reduce a number of hops taken by said communication sent through said peer-to-peer computer environment.

14. The computer implemented method as recited in claim 1 wherein said user requirements is to reduce a round trip time of said communication sent through said peer-to-peer computer environment.

15. A non-transitory computer-usable storage medium having instructions embodied therein for causing a computer system to perform the steps of communicating in a peer-to-peer computer environment:
   receiving a request from a user at a peer provider node computer system, wherein said request is signed by a private key, wherein said peer provider node computer system is a peer node;
   provided a public key verifies said private key, providing potential peers to said user from said peer provider node computer system such that said user is enabled to utilize said peer-to-peer computer environment for a communication according to user requirements;

selecting a relay peer from said potential peers at said user wherein said user contacts each of said potential peers and said relay peer is selected via said user based on communication and hardware capabilities of said potential peers and wherein said relay peer is for said communication;

receiving a portion of said communication from said user at a relay peer, wherein said relay peer is one of said potential peers;

sending said portion of said communication to at least one other user from said relay peer;

sending feedback to said user from said relay peer regarding said communication during said communication;

wherein said receiving said portion of said communication is received with an adjusted parameter of said communication; and wherein said portion of said communication is received with a different error protection scheme for said portion.

16. The non-transitory computer-usable storage medium of claim 15, further comprising:
receiving a request from said user at a storage peer, wherein said storage peer is one of said potential peers and wherein said request is signed by a private key; and
provided a public key verifies said private key, providing encrypted profile information to said user.

17. The non-transitory computer-usable storage medium of claim 15, further comprising:
terminating said receiving said portion of said communication from said user at said relay peer during said communication wherein said relay peer is no longer available for said receiving;
receiving said portion of said communication from said user at a second relay peer; and
sending said portion of said communication to at least one other user from said second relay peer.

18. The non-transitory computer-usable storage medium of claim 15 wherein said relay peer replicates said portion of said communication and sends said replicated said portion to a plurality of other users.

19. The non-transitory computer-usable storage medium of claim 15 wherein said portion of said communication is received with an adjusted encoding rate of said portion.

20. The non-transitory computer-usable storage medium of claim 15 wherein said portion of said communication is received with an adjusted resolution of said portion.

21. The non-transitory computer-usable storage medium of claim 15 wherein said portion of said communication is received with a different codec for said portion.

22. The non-transitory computer-usable storage medium of claim 15, further comprising:
receiving a plurality of portions of said communication from said user at a plurality of relay peers, wherein said plurality of relay peers are said potential peers and wherein each of said plurality of relay peers each receives a different portion of said plurality of portions of said communication; and
sending said plurality of portions of said communication to at least one other user from said plurality of relay peers.

23. The non-transitory computer-usable storage medium of claim 15 wherein said communication is an audio communication.

24. The non-transitory computer-usable storage medium of claim 15 wherein said communication is a video communication.

25. The non-transitory computer-usable storage medium of claim 15 wherein said communication is a multi-party communication.

26. The non-transitory computer-usable storage medium of claim 15 wherein said user requirements is to reduce an estimated geographical length of a path taken by said communication through said peer-to-peer computer environment.

27. The non-transitory computer-usable storage medium of claim 15 wherein said user requirements is to reduce a number of hops taken by said communication sent through said peer-to-peer computer environment.

28. The non-transitory computer-usable storage medium of claim 15 wherein said user requirements is to reduce a round trip time of said communication sent through said peer-to-peer computer environment.

29. A system for communicating in a peer-to-peer computer environment:
a peer provider node configured to receive a request from a user wherein said request is signed by a private key and provided that a public key verifies said private key, said peer provider node is further configured to provide potential peers to said user such that said user is enabled to utilize said peer-to-peer computer environment for a communication according to user requirements;
a storage peer computer system for verifying an identity of said user and providing encrypted contact information related to a user profile to a device associated with said user provided said identity of said user is verified, wherein said storage peer is provided to said user via said peer provider node;
at least one relay peer configured to receive a portion of said communication from said user and configured to send said portion of said communication to a second user, wherein said at least one relay peer is selected from said potential peers via said user wherein said user contacts each of said potential peers and said relay peer is selected based on communication and hardware capabilities of said potential peers;
receiving a portion of said communication from said user at a relay peer, wherein said relay peer is one of said potential peers;
sending said portion of said communication to at least one other user from said relay peer;
sending feedback to said user from said relay peer regarding said communication during said communication;
wherein said receiving said portion of said communication is received with an adjusted parameter of said communication; and
wherein said portion of said communication is received with a different error protection scheme for said portion.

30. The system as recited in claim 29 further comprising:
a plurality of relay peers each configured to receive a different portion of said communication and further configured to send said portions of said communication to said second user.

31. The system as recited in claim 29 wherein said at least one relay peer is further configured to replicate said portion of said communication and send said replicated portions of said portion to a plurality of other users in a multi-party communication.

* * * * *